(12) United States Patent
Au

(10) Patent No.: US 8,793,323 B2
(45) Date of Patent: Jul. 29, 2014

(54) SYSTEM AND METHOD FOR INTEROPERABILITY

(75) Inventor: Luen (Aaron) Au, Union City, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 85 days.

(21) Appl. No.: 13/296,187

(22) Filed: Nov. 14, 2011

(65) Prior Publication Data

US 2012/0124151 A1    May 17, 2012

Related U.S. Application Data

(60) Provisional application No. 61/414,320, filed on Nov. 16, 2010.

(51) Int. Cl.
*G06F 15/16* (2006.01)

(52) U.S. Cl.
USPC .......................................... 709/206; 709/227

(58) Field of Classification Search
USPC .................................. 709/206, 227
See application file for complete search history.

(56) References Cited

U.S. PATENT DOCUMENTS

| 6,333,973 | B1 * | 12/2001 | Smith et al. ................. 379/88.12 |
| 6,901,594 | B1 * | 5/2005 | Cain et al. ..................... 719/310 |
| 7,613,781 | B2 | 11/2009 | Clarke et al. |
| 2002/0097277 | A1 * | 7/2002 | Pitroda ........................ 345/854 |
| 2005/0078677 | A1 * | 4/2005 | Benting et al. ................ 370/390 |
| 2008/0005325 | A1 * | 1/2008 | Wynn et al. ................... 709/225 |
| 2009/0037548 | A1 | 2/2009 | Ordille et al. |
| 2009/0187929 | A1 * | 7/2009 | Kushwaha et al. ........... 719/330 |
| 2010/0185665 | A1 | 7/2010 | Horn et al. |
| 2010/0293475 | A1 | 11/2010 | Nottingham et al. |

OTHER PUBLICATIONS

The International Search Report and Written Opinion for International Application PCT/US2011/060691 dated May 31, 2012.

* cited by examiner

*Primary Examiner* — Thomas Dailey
(74) *Attorney, Agent, or Firm* — Fountainhead Law Group PC

(57) ABSTRACT

A method for enabling interoperability between software applications. The method includes receiving, at a client software application, a notification originating from a first software application; delivering the notification to a user; receiving a reply from the user in response to the notification; and causing an event to be performed in a second software application based on the reply.

10 Claims, 6 Drawing Sheets

SYSTEM AND METHOD FOR INTEROPERABILITY

CROSS-REFERENCE TO RELATED APPLICATIONS

The present invention claims priority benefit to U.S. provisional patent application titled, "SYSTEM AND METHOD FOR INTEROPERABILITY," filed on Nov. 16, 2010 and having Ser. No. 61/414,320, the entire contents of which are incorporated herein by reference.

BACKGROUND

1. Field of the Invention

The present invention relates to the field of computer software and, in particular, to a system and method for interoperability.

2. Description of the Related Art

Traditionally, a software application, such as Microsoft Outlook, can be configured to receive notifications from one or more other software applications, including SaaS (software as a service) applications. FIG. 2 is a conceptual diagram of a system for performing actions based on receiving notifications, according to the prior art. One or more SaaS applications 202-1, 202-2, 202-3 may be configured to transmit notifications to a centralized client application 204, such as Microsoft Outlook. A user can view the notification via another application, such as a browser application 206. The notification may include a link that allows the user to access the SaaS application 202-1, 202-2, 203-3. Using the browser application 206, the user can then perform an action directly with the SaaS application 202-1, 202-2, 203-3 that transmitted the notification.

However, each SaaS application is independently operated and there is typically no interoperability between SaaS applications. Point-to-point integration between two SaaS applications (as indicated by the arrow between SaaS application 202-2 and SaaS application 202-3) is time consuming and tedious to implement.

Accordingly, there remains a need in the art for a technique that addresses the drawbacks and limitations discussed above.

SUMMARY

Embodiments of the invention provide an interoperability framework that allows notifications to be received from one or more software applications by a centralized client application. The framework further includes a technique for delivering the notifications to a user, who can reply to the notifications. Based on the reply performed directly with the notification, an action can be performed in one or more software applications, which may or may not include the software application that issued the original notification.

One or more embodiments of the invention provide a method for enabling interoperability between software applications. The method includes receiving, at a client software application, a notification originating from a first software application; delivering the notification to a user; receiving a reply from the user in response to the notification; and causing an event to be performed in a second software application based on the reply.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide an interoperability framework that allows notifications to be received from one or more software applications by a centralized client application. The framework further includes a technique for delivering the notifications to a user, who can reply to the notifications. Based on the reply performed directly with the notification, an action can be performed in one or more software applications, which may or may not include the software application that issued the original notification.

Hardware Overview

Figure 1:
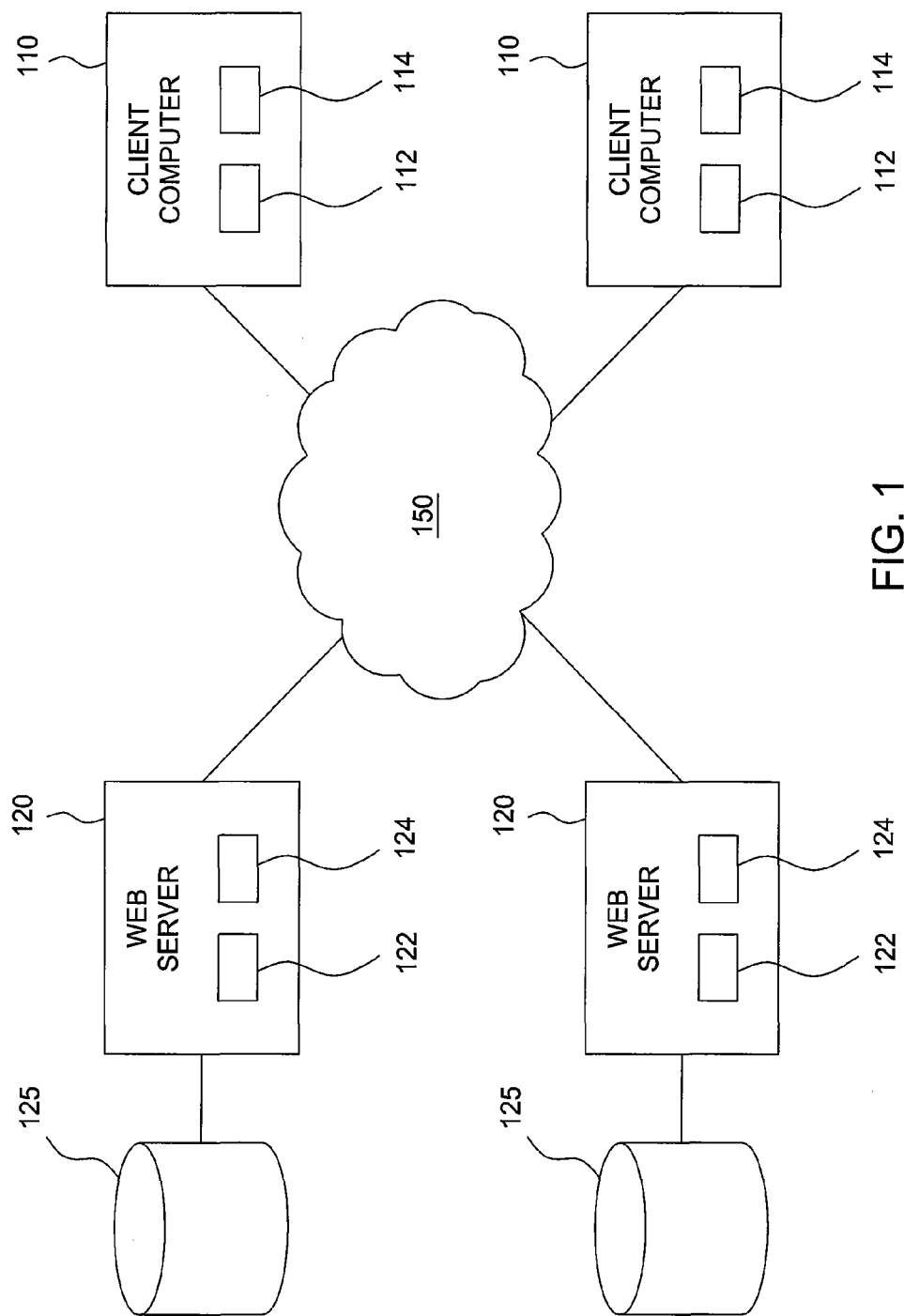
FIG. 1 illustrates a networked computer environment in which embodiments of the invention may be practiced.

FIG. 1 illustrates a networked computer environment in which embodiments of the invention may be practiced. As shown, the networked computer environment includes a plurality of client computers 110 (only two of which are shown) and a plurality of web servers 120 with associated content storage units 125. The client computers 110 and the web server computers 120 are connected over a computer network 150, e.g., the Internet.

Each client computer 110 includes conventional components of a computing device, e.g., a processor 112, system memory 114, a hard disk drive, input devices such as a mouse and a keyboard, and output devices such as a monitor, among others. Each web server 120 includes a processor 122 and a system memory 124, and manages the contents stored in its respective content storage unit using a relational database software. The web server is programmed to communicate with the client computers 110 and other web servers using the TCP/IP protocol. The client computers 110 are programmed to execute web browser programs and other software applications and access the web pages and/or applications managed by the web servers by specifying a uniform resource locator (URL) for the web server into the browser.

In the embodiments of the present invention described below, users are respectively operating the client computers 110 that are connected to the web servers 120 over the Internet. The web pages that are displayed to a user are transmitted from the web servers 120 to that user's client computer 110 and processed by the web browser program stored in that user's client computer 110 for display through the monitor of that user's client computer 110.

Client computers 110 includes a System 200 may be a personal computer, smart phone, touch pad, touch screen, or any other device suitable for practicing one or more embodiments of the present invention. It should be noted that the present invention can be implemented in hardware, software, or in a combination of hardware and software, e.g., using application specific integrated circuits (ASIC), a general purpose computer or any other hardware equivalents.

Software Interoperability

Embodiments of the invention provide a platform that enables interoperability between software applications.

Figure 2:
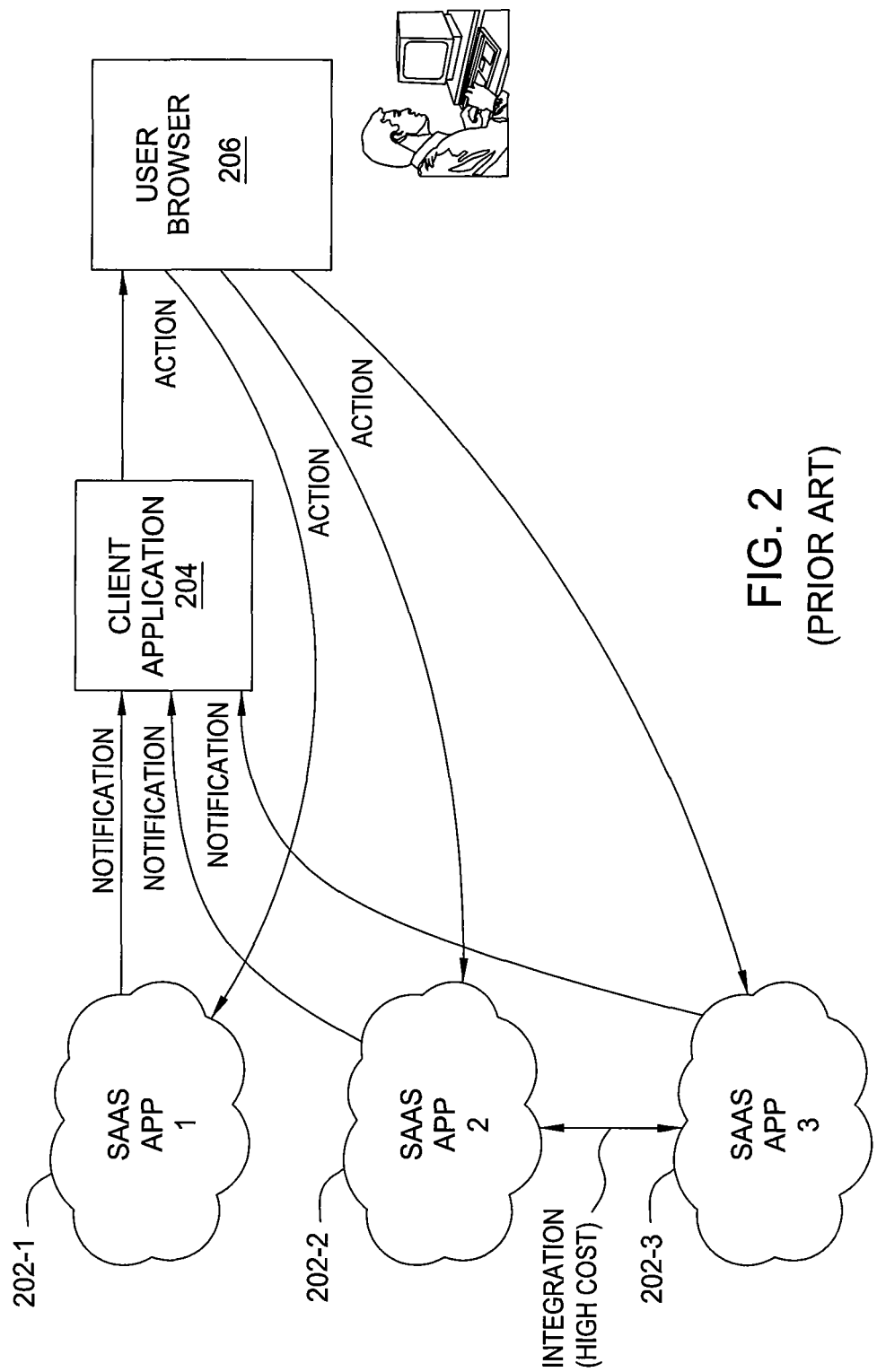
FIG. 2 is a conceptual diagram of a system for performing actions based on receiving notifications, according to the prior art.

Using conventional techniques, as shown in FIG. 2, a user can receive a notification from a software application and, in turn, perform some action with the software application from which the notification originates. The software application can be any type of application, including a word processing application, a gaming application, a spreadsheet application, a business execution software application an accounting application, a web-based application, or any technically feasibly type of software application. However, using prior art techniques, to bring data from one software application to another, the user must receive the notification from the first application, log-in to the second application, and then cut-and-paste the data to the second application. Such a process can be tedious and time consuming.

Embodiments of the invention provide a framework for allowing multiple software applications to communicate with one another through a centralized client application. In one embodiment, the centralized client application comprises an email client (e.g., Microsoft Outlook), a mobile client, a web-based client, a stand-alone desktop client, or any other technically feasible client application.

Figure 3:
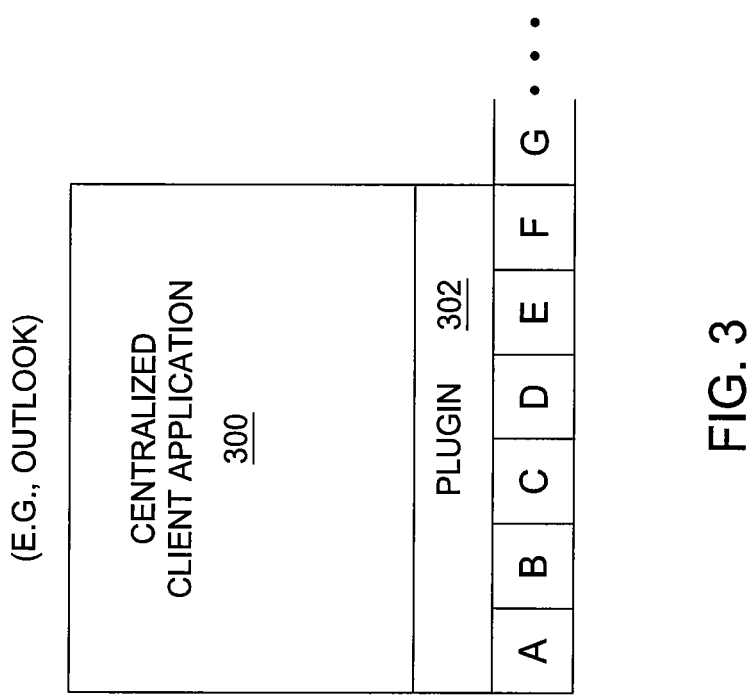
FIG. 3 is a conceptual diagram of a framework for allowing multiple software applications to communicate with one another, according to one embodiment of the invention.

FIG. 3 is a conceptual diagram of a framework for allowing multiple software applications to communicate with one another, according to one embodiment of the invention. As shown, multiple software applications A, B, C, D, E, F, G . . . can communicate with a centralized client application 300 via a plugin 302. The plugin 302 may include a glossary of terms recognized by the different applications. For example, a term may be associated with a particular type of data or action. The glossary of terms forms a link that allows communication to be transmitted between the multiple software applications. In addition, the plugin 302 may include a software development kit (SDK) that allows a user to define additional terms and actions.

In one embodiment, the client application includes a rule engine that allows the plugin 302 to communicate with the various software applications A-G. In some embodiments, the rule engine may be configured to parse a predefined list of different notifications received from the software applications A-G. In addition, the rule engine may be configured to parse predefined commands recited from the user in response to the notifications and perform some action with the software applications A-G.

Additionally, in some embodiments, the rule engine may be configured to allow a user to define new notifications that the rule engine is capable of parsing and new commands and corresponding actions that the rule engine is configured to act upon. For example, the rule engine may be configured to expose an API (Application Programming Interface) that allows a user to define custom notifications, commands, and actions for a particular software application. Some embodiments of the invention may provide for a user-defined rule engine that can allow more complex rule processes. In one embodiment, the user can define a rule that translates an individual "simple" action to a more complex "business rule action" across multiple software applications. As an example, a user-configured rule engine may be configured to receive a reply from a user in response to the notification. The reply may include a parameter value that can be used to perform a more complex action with one or more software applications.

In still further embodiments, a notification can be received by the client application from a first software application and delivered to the user. In response, the user may submit a reply to the notification, which causes an action to be performed in a second software application (i.e., a different software application than the first software application). In this manner, interoperability between software applications can be achieved. Accordingly, embodiments of the invention provide bi-directional content and action, whereas prior art techniques only allowed for content to be distributed in one direction (i.e., to the user).

For example, in a social networking context, a message can be broadcast to all users using prior art techniques. According to embodiments of the invention, a notification can be received from one software application that causes some action to be performed in another software application.

In the business execution context, for example, a decision can be made in a hiring application to hire a new employee. In turn, a budget application may receive this information and recalculate a budget based on the new hire.

Figure 4:
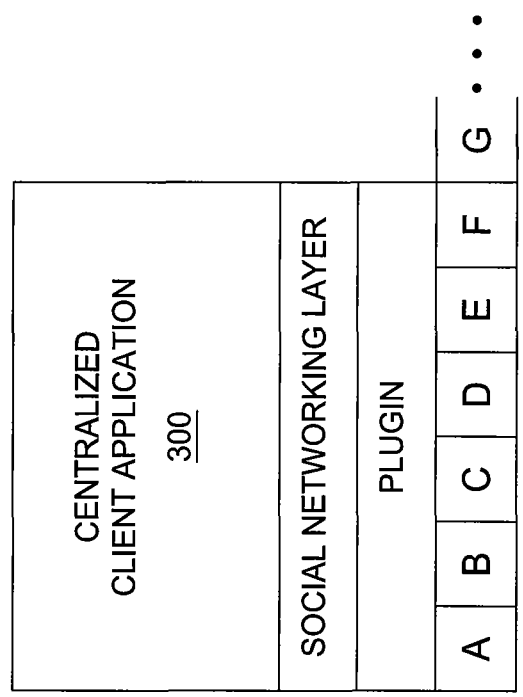
FIG. 4 is a conceptual diagram of a framework for allowing multiple software applications to communicate with one another that includes a social networking layer, according to one embodiment of the invention.

FIG. 4 is a conceptual diagram of a framework for allowing multiple software applications to communicate with one another that includes a social networking layer, according to one embodiment of the invention. In conventional approaches, most social networking is associated with a point-to-point relationship. For example, if a first member follows a second member, then the first member may receive status updates from the second member. However, in an enterprise context, such as a corporation, a point-to-point social networking relationship is inefficient to set up and maintain. Each member must maintain point-to-point relationships with other relevant members, and if a member is removed or added, all of the point-to-point relationships need to be created manually.

Most enterprise organizations have a structure, e.g., a hierarchical structure. Thus, instead of having an ad hoc point-to-point style social network, the enterprise organization may have the social network be organized by groups. For example, location-based or department-focused groups. Thus, based on the attributes of a particular user, the user can be automatically added to various groups in the social networking environment. Accordingly, when a message is received that is directed to members of a particular group, all users that are part of that group would receive the message.

In addition, establishing a social networking layer in the interoperability framework (as shown in FIG. 4) allow for more intelligent queries to be performed. For example, a user may be looking for other members in the enterprise that have a particular knowledge. The user can create a feed entry that is broadcast to relevant members. In addition, the feed entry can automatically generate a query that performs a search in a database against the user attributes to determine users that have the particular knowledge that the user is looking for. In one embodiment, a special tag may be included in the feed entry that causes the query to be automatically generated, e.g., a "@" or "#" symbol. Thus, the data associated with the user attributes becomes a knowledge network that allows for easy system integration.

In some embodiments, a security layer (not shown) may also be included in the interoperability framework. For example, a particular message or notification may be received by only those users that meet certain security clearance. The security clearance may be based on the user's role in the organization, who is the user's manager, or any other criteria.

Figure 5:
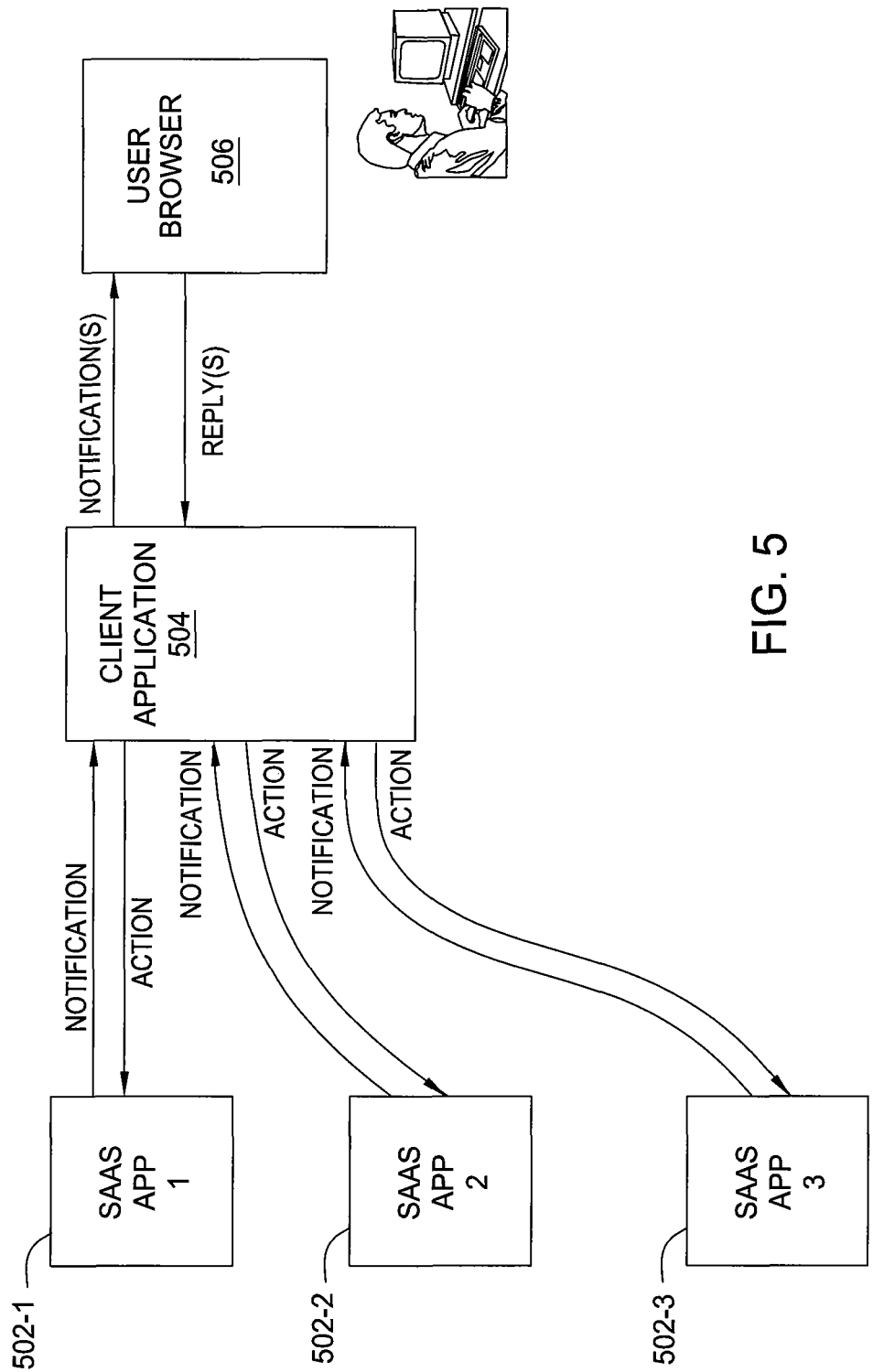
FIG. 5 is a conceptual diagram of a system for performing actions based on receiving notifications, according to one embodiment of the invention.

FIG. 5 is a conceptual diagram of a system for performing actions based on receiving notifications, according to one embodiment of the invention. One or more SaaS applications 502-1, 502-2, 502-3 may be configured to transmit notifications to a centralized client application 504, such as an email client (e.g., Microsoft Outlook), a mobile client, or any other client application. The notification is parsed by the client application 504 and is then communicated to the user.

A user can view the notification via another application, such as a browser application 506. In reply to the notification, the user may enter a response that is delivered to the client application 504. The client application 504 parses the response from the browser application 506 and can perform an action with one or more SaaS applications 502-1 to 502-3. In some embodiments, the action is performed with the same software application that issued the original notification. In other embodiments, the action is performed with a different software application than the one that issued the original notification. In still further embodiments, the action is performed with two or more software applications, which may or may not include the software application that issued the original notification.

Figure 6:
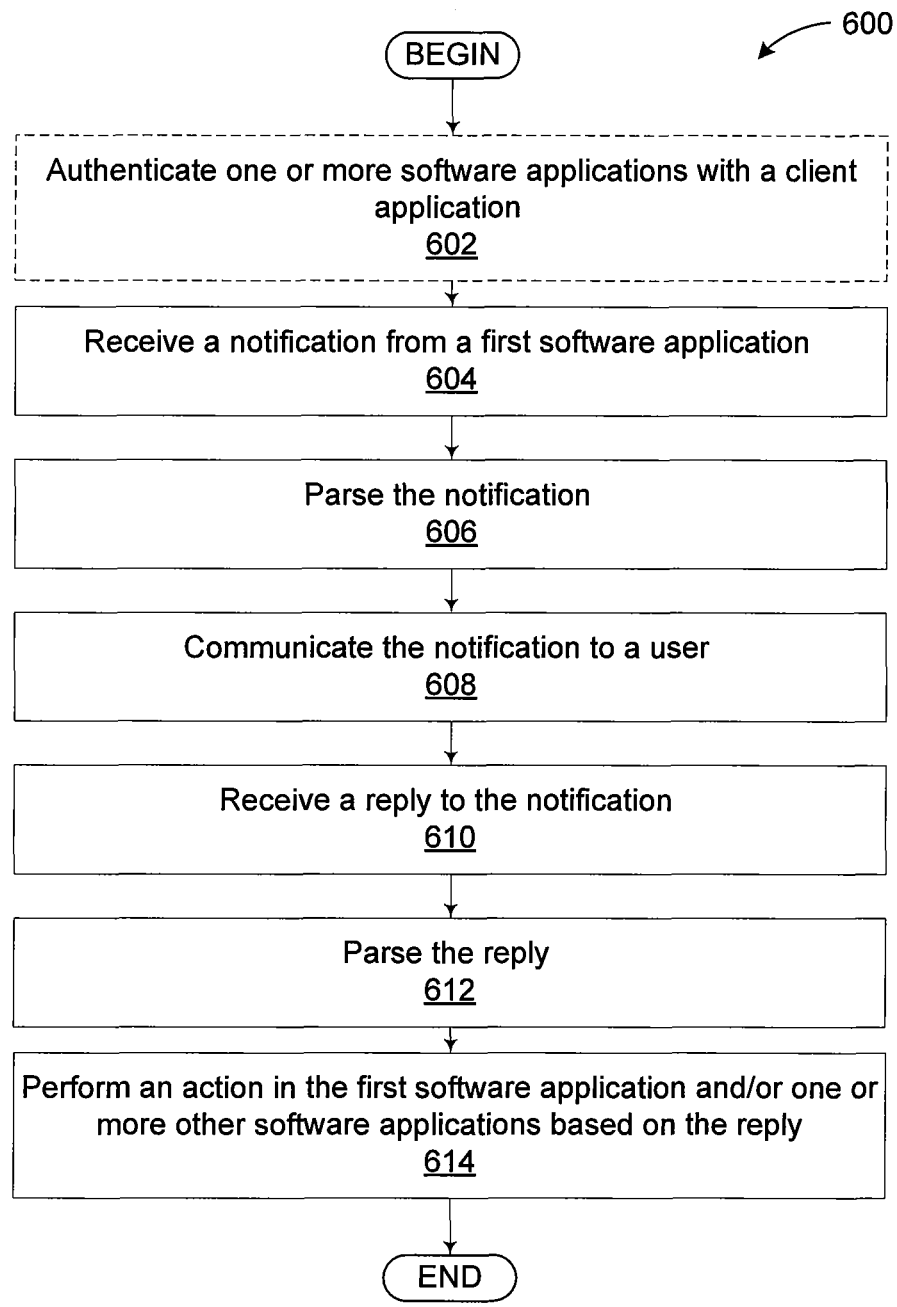
FIG. 6 is a flow diagram of method steps for performing actions based on receiving notifications, according to one embodiment of the invention.

FIG. 6 is a flow diagram of method steps for performing actions based on receiving notifications, according to one embodiment of the invention. Persons skilled in the art will understand that, even though the method 600 is described in conjunction with the systems of FIGS. 1-5, any system configured to perform the method steps, in any order, is within the scope of embodiments of the invention.

As shown, the method 600 begins at step 602, where a client application, such as, for example, an email client application, a mobile phone application, a web-based application, or a business execution software application, which is executed by a processor, authenticates one or more software applications with the client application. Authentication of the one or more software applications cane performed via any technically feasible authentication protocol. For example, a handshaking protocol may be implemented between a software application and the client application. Authentication of the software applications with the client application can help ensure that the software applications that access the client application are legitimate and not malicious.

In some embodiments, step 602 is optional (as indicated by the dotted lines around step 602) and is omitted.

At step 604, the client application receives a notification from a first software application. In some embodiments, the notification is a built-in feature of the first software application. In other embodiments, a user can customize the first software application to generate a notification when a certain criterion or criteria are satisfied. For example, in the business execution context, a notification may be generated by an accounting software application when an expense report needs to be approved by a manager. A notification that a pending expense report is ready to be approved/disapproved may be sent from the accounting software application to the client application.

At step 606, the client application parses the notification. As described above, the client application may be configured with a rule engine configured to parse the notifications received from the one or more software applications.

At step 608, the client application communicates the notification to a user. The notification can be communicated to the user in any technically feasible manner. For example, the notification can be text-based or graphical. The notification may be emailed to the user or sent as a text/SMS message to the user. In another example, a "reminder" or pop-up notification can be displayed in the user's web browser or email client (e.g., Outlook). In another example, the notification can be displayed as an overlay or pop-up on the user's mobile phone. The notification on the mobile device may be associated with a particular "app" installed on the user's mobile device or directly associated with an operating system of the mobile device.

At step 610, the client application receives a reply to the notification. The user can reply to the notification in different ways depending on the mode in which the notification is received and the options provided for a particular notification. For example, if the notification is a text message, the user can send a response text message. In some embodiments, the notification text can include valid example responses, e.g., "Reply with 'Y' for Yes or reply with 'N' for No." In another example, when the notification is delivered as a notification on the user's mobile device, the notification may include one or more GUI (graphical user interface) buttons that the user can select to send the reply.

Continuing with the example provided above of approving an expense report, the notification may be received on the user's mobile device. The notification may provide a link to allow the user to view the expense report. If the user wishes to approve the expense report, the user may, for example, select an "Approve" button displayed in the notification. Similarly, if the user wishes to deny the expense report, the user may, for example, select a "Deny" button displayed in the notification. The reply is transmitted from the user's mobile device to the client application via the appropriate protocol (e.g., email, SMS, HTTP, etc.).

At step 612, the client application parses the reply. In various embodiments, the reply may be a text-based reply or a signal that indicates a selection of a particular button included in the notification. The rule engine in the client application can be configured to parse the reply received in response to the notification. In some embodiments, the reply may be received via a different communication channel than the communication channel in which the notification was transmitted. For example, the notification may be sent via email, but the reply may be sent via text message.

At step 614, the client application performs an action in the first software application and/or one or more other software applications based on the reply. The reply is configured to cause some action to be taken in a software application. The action may be taken in the same software application that issued the notification (i.e., the "first software application") or may be taken in another software application. In some embodiments, the action may be taken in a plurality of software applications, which may or may not include the software application that issued the notification. Accordingly, the user can cause some action to be taken in one or more software applications directly from the notification itself, without being required to log-in to the application(s) and perform the action manually.

Advantageously, interoperability between software applications can be achieved without having to directly and manually program the interoperability between specific pairs of software applications. In addition, embodiments provide for "two-way" notifications, where an action can be performed in a software application based on a notification received, without requiring the user to log-in to the application and perform the action manually. Still further, embodiments provide a technique to programmatically perform actions using notifications, where the user can define custom notifications and actions that can be taken in response to the notifications.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for enabling interoperability between a plurality of software applications, the method comprising:
    establishing communications, at a client application executing on a computer, with each of a plurality of software applications executing on one or more server computers;
    receiving, at the client application, a first notification originating from a first software application of the plurality of software applications;
    receiving, at the client application, a second notification originating from a second software application of the plurality of software applications;
    parsing, by a rule engine on the client application, the first notification and the second notification, wherein the rule engine is configured to parse a predefined list of notifications from the first software application and the second software application;
    delivering the first notification and the second notification to a user;
    receiving, at the client application, a first reply from the user in response to the first notification and a second reply from the user in response to the second notification; and
    parsing, by the rule engine on the client application, the first reply and the second reply, wherein the rule engine is configured to parse predefined commands recited from the user in response to the first notification and the second notification;
    the client application causing a first event to be performed in the second software application based on the first reply from the user in response to the first notification from the first software application, and the client application causing a second event to be performed in the first software application based on the second reply from the user in response to the second notification from the second software application.

2. The method according to claim 1, wherein the plurality of software applications communicate with the client application via a plugin, and wherein the plugin comprises a glossary of terms recognized by each of the plurality of software applications.

3. The method according to claim 1, wherein the client software application comprises an email client.

4. The method according to claim 1, wherein the client software application comprises a mobile phone client application.

5. The method according to claim 1, wherein each of the first notification and second notification and the first event and second event are user-defined via an API (Application Programming Interface) associated with the client software application.

6. The method according to claim 1, further comprising authenticating the first software application and the second software application with the client software application.

7. The method according to claim 1, wherein at least one of the first reply or second reply from the user includes a parameter value, the method further comprising causing the first event or second event to be performed in the first software application or the second software application is based on the parameter value.

8. The method according to claim 1, wherein the rule engine is user-defined, wherein the predefined list of notifications comprises user-defined notifications and the predefined commands comprise user-defined commands that the rule engine is configured to act upon.

9. The method according to claim 1, wherein the rule engine is user-defined, wherein the predefined commands comprise one or more user-defined commands that translates an action corresponding to the first reply or second reply to a complex business rule action across more than one of the plurality of software applications.

10. The method according to claim 1, wherein the client application comprises a social networking layer, the method further comprising:
    creating, by the user, a feed entry;
    broadcasting the feed entry to a plurality of members of a group, wherein members of the group are automatically included in the group based on attributes of each member; and
    automatically generating a query to search a database against user attributes to determine users that have particular knowledge.

* * * * *